United States Patent [19]

Nakai et al.

[11] Patent Number: 4,490,009

[45] Date of Patent: Dec. 25, 1984

[54] OPTICAL FIBER SUBMARINE CABLE

[75] Inventors: Taiichiro Nakai, Fujisawa; Kahei Furusawa, Kamifukuoka; Masanori Sato, Machida; Yasuhiko Niiro, Yokohama; Yoshihiro Ejiri, Tokyo; Makoto Nunokawa, Kawasaki, all of Japan

[73] Assignee: Kokusai Denshin Denwa Kabushiki Kaisha, Tokyo, Japan

[21] Appl. No.: 408,160

[22] Filed: Aug. 16, 1982

Related U.S. Application Data

[63] Continuation of Ser. No. 069,553, Aug. 24, 1979, abandoned.

[30] Foreign Application Priority Data

Aug. 30, 1978 [JP] Japan ............... 53-104869

[51] Int. Cl.³ .............................. G02B 5/14
[52] U.S. Cl. ............................. 350/96.23
[58] Field of Search .............. 350/96.23; 174/70 R, 174/70 S, 101, 102 R, 102 C

[56] References Cited

U.S. PATENT DOCUMENTS

| 2,000,355 | 5/1935 | Sichtermann | 174/97 |
| 4,156,104 | 5/1979 | Mondello | 350/96.23 X |
| 4,416,508 | 11/1983 | Dey et al. | 350/96.23 |

FOREIGN PATENT DOCUMENTS

| 2820510 | 11/1978 | Fed. Rep. of Germany | 350/96.23 |

OTHER PUBLICATIONS

G. Wilkins, "Fiber Optic Cables For Undersea Communications," *Fiber and Integrated Optics*, vol. 1, No. 1, Jan. 1977.

*Primary Examiner*—John Lee
*Attorney, Agent, or Firm*—Robert E. Burns; Emmanuel J. Lobato; Bruce L. Adams

[57] ABSTRACT

An optical fiber submarine cable, which is provided with at least one coated optical fiber, a power supplying, pressure resisting layer of a pipe-like configuration, a tension resisting wire layer formed of a conductive material of relatively low conductivity and disposed in close contact with the power supplying, pressure resisting layer of the pipe-like configuration, and an insulator layer disposed around the tension resisting wire layer. The power supplying, pressure resisting layer is formed as at least one inner layer and an outer layer. The inner layer is formed as a single layer or composite layers by forming a tape-like good conductor material into a pipe-like configuration with its joint made a mere butt, or by assembling together a plurality of pressure resisting material segments equally divided in the circumference direction for at least one layer of the inner layer and having housed the above-mentioned at least one coated optical fiber in an optical fiber housing space defined centrally of the inner layer. The outer layer is formed by winding a metal tape on the inner layer.

4 Claims, 2 Drawing Figures

OPTICAL FIBER SUBMARINE CABLE

This is a continuation of application Ser. No. 069,553, filed 8/24/79 now abandoned.

BACKGROUND OF THE INVENTION

This invention relates to an optical fiber submarine cable forming a long-distance, optical fiber submerged repeater system in the field of optical communications using a low-loss optical fiber as a transmission medium.

The optical fiber has advantages of low loss, wide band and light weight and hence is regarded as a promising transmission medium which will succeed a coaxial submarine cable heretofore employed. The optical fiber is made of los-loss silica glass or optical glass, and hence is brittle and easily broken under an external force, such as bending or tensile force; and when the optical fiber is immersed is seawater for a long time, a very small crack in the glass is likely to grow, resulting in breakage of the optical fiber. Therefore, the optical fiber is usually coated with nylon or like material so as to enhance its mechanical properties and prevent their degradation. A submarine cable is laid as deep under the sea as 8000 m and exposed to a high pressure of about 800 kg/cm$^2$ on the sea bottom. When the coated optical fiber is applied hydraulic or like pressure, the optical fiber is slightly bent due to nonhomogeneity of the coating material, causing a marked increase in transmission loss.

In view of the above, it has already been proposed to house the coated optical fiber in a high pressure resisting pipe for protecting the coated optical fiber from a high hydraulic pressure on the sea bottom. Further, in a long-distance, submerged repeater system, the electric power must be supplied to submerged repeaters; this requires the provision of a power supplying feeder in the submarine cable and an insulating layer for insulating the power supplying feeder. Moreover, tension resisting wires of large tensile strength are needed for the submarine cable so that it may not be broken when laid deep under the sea or drawn up for repair. In conventional optical fiber submarine cables, however, no consideration is paid to early attenuation of a surge which is caused by a short-circuit or opening trouble of the power supplying feeder.

SUMMARY OF THE INVENTION

An object of this invention is to provide a simple-structured and easy-to-manufacture optical fiber submarine cable having a function of attenuating a surge resulting from the short-circuit or opening trouble of the submarine cable.

In accordance with this invention, there is provided an optical fiber submarine cable comprising: at least one coated optical fiber, a power supplying, pressure resisting layer in a pipe-like configuration, a tension resisting wire layer formed of a conductive material of relatively low conductivity, such as steel wires, in comparison with the material of the power supplying, pressure resisting layer and disposed in close contact with the power supplying, pressure resisting layer of the pipe-like configuration, and an insulator layer disposed around the tension resisting layer. The power supplying, pressure resisting layer of the pipe-like configuration is formed as at least one inner layer and an outer layer. The inner layer is formed as a single layer or composite layers by forming a tape-like good conductor material, such as copper or aluminum, into a pipe-like configuration with its joint made a mere butt, or by assembling together a plurality of pressure resisting material segments equally divided in the circumferential direction for each layer of the inner layer and having housed said at least one coated optical fiber in an optical fiber housing space defined centrally of the inner layer. The outer layer is formed by winding a metal tape on the inner layer.

BRIEF DESCRIPTION OF THE DRAWING

The present invention will hereinafter be described in detail with reference to the accompanying drawings, in which.

DESCRIPTION OF THE PREFERRED EMBODIMENTS

Figure 1:
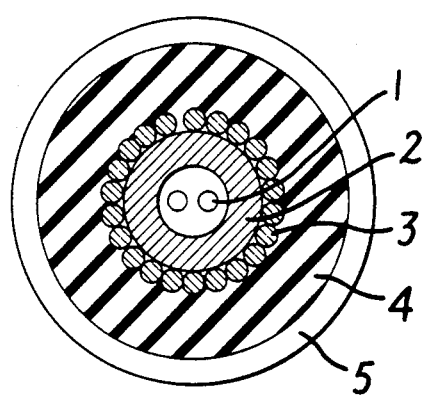
FIG. 1 is a cross-sectional view showing an embodiment of this invention.

With reference to FIG. 1, showing a cross-sectional view of an embodiment of this invention, reference numeral 1 indicates at least one single-mode or multi-mode optical fiber, and 2 designates a pressure resisting layer formed of copper, aluminum or like good conductor of electricity. When an external pressure P (kg/mm$^2$) is applied to a pipe having an outer diameter $d_o$ and an inner diameter $d_i$, the magnitude of a maximum stress $\sigma$ (kg/mm$^2$) by the external pressure is given by the following equation:

$$\sigma = -P \frac{2 \cdot (d_o/d_i)^2}{(d_o/d_i)^2 - 1} \text{ (kg/mm}^2\text{)}$$

For example, when the inner and outer diameters are 2 mm$\phi$ and 4 mm$\phi$, respectively, if the external pressure is 8 kg/mm$^2$ corresponding to the hydraulic pressure at the depth of 8000 m, the abovesaid magnitude $\sigma$ is about 21.3 kg/mm$^2$; if the yield point of the pipe material is at least higher than 21.3 kg/mm$^2$, the cylinder withstands the external pressure of 8 kg/mm$^2$, and consequently the pressure resisting layer can be made of copper, aluminum or the like. In a case where a pressure resisting layer having an inner diameter of 2 mm$\phi$ and an outer diameter of 4 mm$\phi$ is formed of copper having conductivity of 100%, a DC resistance is about 1.8 $\Omega$/km, and the pressure resisting layer can be used as a power supplying feeder. The geometry of the pressure resisting layer may be determined suitably in accordance with a required maximum pressure to withstand a required DC resistance and electrical and mechanical properties of the pressure resisting layer material. Reference numeral 3 identifies tension resisting wires which are made of a material of lower conductivity than copper or aluminum, such a steel wires, and disposed in close contact with the pressure resisting layer 2 made of a good conductor of electricity. Since the submarine cable is required to have a tensile strength so that it can withstand laying in as deep a sea as 8000 m and drawing up therefrom, the tension resisting wires are needed for the submarine cable. The tension resisting wires may be formed of various materials; but by disposing the tension resisting wires of a conductive material of lower conductivity than the power supplying feeder material, such as steel wires, in close contact with the power supplying, pressure resisting layer 2, such advantages as will be described later can be obtained.

Upon occurrence of a short-circuit or opening trouble in the cable, a surge like a pulse including high frequency components generated therein may be in some cases propagated in accordance with "skin effect" in the power supplying feeder to break down repeaters. In the submarine cable system which operates under a high power voltage and is difficult to repair, a measure against the surge is important. The surge is mainly propagated on the outer periphery of the power supplying feeder in accordance with "skin effect" so that attenuation of the surge can be prompted by providing the tension resisting wires of a conductive material of relatively low conductivity in close contact with the power supplying feeder, as described above. Reference numeral 4 denotes an insulator for insulating the power supplying feeder, and 5 represents a sheath. The insulator 4 may also be used as the sheath 5.

Figure 2:
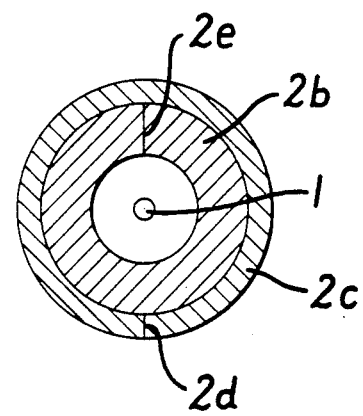
FIG. 2 is a cross-sectional view showing a specific operative example of a part of the cable structure of this invention.

A specific operative structure of the pressure resisting layer may be at least one inner layer and an outer layer such as shown in FIG. 2 in which a tape-like material 2b of the inner layer is formed into a pipe-like configuration and its joint 2e is made a mere butt, and a metal tape 2c of the outer layer is wound on the inner layer in its lengthwise direction and formed into a pipe-like configuration or wound spirally about the inner layer, joints 2d of the tape 2c being welded.

As has been described in the foregoing, the optical fiber submarine cable of this invention is composed of a small number of components and hence is simple in construction but has many functions and exhibits the following advantages:

(1) The pressure resisting layer for protecting the coated optical fiber from a high hydraulic pressure in deep seas is made of a good conductor of electricity; therefore, it can be used as a power supplying feeder.

(2) Since the tension resisting wires made of a conductive material of relatively low conductivity are disposed in close contact with the power supplying, pressure resisting layer, it is possible to facilitate attenuation of a surge which is caused by short-circuiting or opening of the cable and propagated in the power supplying feeder.

(3) The insulator can be used both to insulate the power supplying feeder and protect the cable.

What we claim is:

1. An optical fiber repeatered submarine cable comprising: at least one coated optical fiber defining a signal path in the cable; a pressure-resisting, electrically-conductive fluid-tight, coreless, tubular layer having a tubular geometry with an inner diameter and an outer diameter selected dimensionally with a relationship selected to define a selected dimensional cross-section and thickness of the tubular layer to withstand a high hydraulic pressure while submerged in deep seas and simultaneously effective to allow relative optimum conduction of direct current for use thereof as a power-supplying feeder, the pressure-resisting layer having a conduit shaped configuration defining a central axial housing space protectively enclosing and housing the coated optical fiber extending longitudinally therein; an electrically-conductive, tension-resisting wire layer made of a material having relatively low electrical conductivity lower than the electrical conductivity of the material of said pressure-resisting layer functioning as said power-supplying feeder and disposed in close contact circumferentially and axially with the outermost surface of said pressure-resisting layer for effectively attenuating surges of high voltages like a pulse including high frequency components transmitted on an outer surface thereof by skin effect; and an insulator layer disposed around said tension-resisting wire layer and axially thereof.

2. An optical fiber repeatered submarine cable according to claim 1, in which said pressure-resisting, power supplying feeder layer is made as at least one inner layer and an outer layer.

3. An optical fiber repeatered submarine cable according to claim 2, in which said at least one inner layer is a tape-like material formed into a conduit-shaped configuration with a butt joint.

4. An optical fiber repeatered submarine cable according to claim 3, in which said outer layer is formed of a metallic tape wound on the inner layer.

* * * * *